United States Patent
Kanno (10) Patent No.: US 8,852,459 B2
(45) Date of Patent: Oct. 7, 2014

(54) POLYPHENOL INCREASING AGENT FOR HARVESTED TEA LEAVES, RESIN PELLET, HARVESTED TEA LEAF STORAGE SHEET AND MANUFACTURING METHOD THEREFOR

(76) Inventor: Minoru Kanno, Sendai (JP)

(*) Notice: Subject to any disclaimer, the term of this patent is extended or adjusted under 35 U.S.C. 154(b) by 0 days.

(21) Appl. No.: 13/981,030

(22) PCT Filed: Apr. 2, 2012

(86) PCT No.: PCT/JP2012/059007
§ 371 (c)(1),
(2), (4) Date: Jul. 22, 2013

(87) PCT Pub. No.: WO2012/133901
PCT Pub. Date: Oct. 4, 2012

(65) Prior Publication Data
US 2013/0299746 A1 Nov. 14, 2013

(30) Foreign Application Priority Data
Mar. 31, 2011 (JP) .................................. 2011-080379

(51) Int. Cl.
| C09K 15/08 | (2006.01) |
| A23B 7/00 | (2006.01) |
| B65D 85/50 | (2006.01) |
| B65D 85/52 | (2006.01) |
| A23F 3/06 | (2006.01) |
| A23L 3/3562 | (2006.01) |
| A23L 3/3544 | (2006.01) |
| A23B 7/154 | (2006.01) |

(52) U.S. Cl.
CPC .............. A23L 3/3562 (2013.01); A23F 3/06 (2013.01); A23B 7/154 (2013.01); A23L 3/3544 (2013.01); A23V 2002/00 (2013.01)

USPC ........... 252/404; 252/407; 252/393; 252/384; 53/400; 426/118; 426/323; 426/545; 426/639; 426/658

(58) Field of Classification Search
None
See application file for complete search history.

(56) References Cited

U.S. PATENT DOCUMENTS

| 2011/0165312 A1* | 7/2011 | Kanno | .......................... 426/639 |
| 2013/0299746 A1* | 11/2013 | Kanno | .......................... 252/393 |

FOREIGN PATENT DOCUMENTS

| JP | A-3-236301 | 10/1991 |
| JP | A-6-199385 | 7/1994 |

(Continued)

OTHER PUBLICATIONS

77 New Business Joseikin Jusho Dai 13 Kai (Heisei 22 Nendo) Kigyo Interview, 77 Business Joho, Jul. 27, 2011, No. 54, pp. 10-15.

(Continued)

*Primary Examiner* — Joseph D Anthony
(74) *Attorney, Agent, or Firm* — Oliff PLC (57) ABSTRACT

A polyphenol increasing agent for plant leaves, a polyphenol and amino acid increasing agent for plant leaves, a resin pellet, a plant leaf storage sheet, and a method for manufacturing a plant leaf storage sheet which can improve the storability of the plant leaves such as leafy vegetables and tea leaves are provided. A polyphenol increasing agent for plant leaves includes proanthocyanidins and trehalose. The polyphenol increasing agent for plant leaves preferably includes proanthocyanidins and trehalose at a weight ratio of 1:15 to 1:60. A plant leaf storage sheet includes the polyphenol increasing agent for plant leaves.

8 Claims, 8 Drawing Sheets

(56) References Cited

FOREIGN PATENT DOCUMENTS

| | | |
|---|---|---|
| JP | A-9-206019 | 8/1997 |
| JP | A-2006-28496 | 2/2006 |
| JP | A-2006-101732 | 4/2006 |
| JP | A-2006-207046 | 8/2006 |
| JP | A-2010-45986 | 3/2010 |
| JP | 4 579344 | 11/2010 |

OTHER PUBLICATIONS

International Search Report issued in International Patent Application No. PCT/JP2012/059007 mailed May 15, 2012.

Jul. 28, 2014 Extended European Search Report issued in Application No. 12764835.0.

\* cited by examiner

POLYPHENOL INCREASING AGENT FOR HARVESTED TEA LEAVES, RESIN PELLET, HARVESTED TEA LEAF STORAGE SHEET AND MANUFACTURING METHOD THEREFOR

TECHNICAL FIELD

The present invention relates to a polyphenol increasing agent for harvested tea leaves, a polyphenol and amino acid increasing agent for harvested tea leaves, a resin pellet, a harvested tea leaf storage sheet, and a method for manufacturing a harvested tea leaf storage sheet.

BACKGROUND ART

Leaves of plants that are used as food include Japanese parsley and cabbage, lettuce, spinach, Japanese radish leaves, tea leaves, and mulberry leaves. Among these, as a method of long-term storage of leafy vegetables such as Japanese parsley, cabbage, lettuce and spinach in the raw state, there is a method for storing them by putting them in a bag made of a film having a plurality of holes (see, for example, Japanese Patent Laid Open No. 6-199385). In addition, green tea leaves, oolong tea leaves and black tea leaves are generally stored in a dried state. In recent years, mulberry leaves, which had been primarily used in sericulture, are also produced as mulberry leaf tea (see, for example, Japanese Patent Laid Open No. 2006-101732) and stored by drying raw mulberry leaves after steaming them (see, for example, Japanese Patent Laid Open No. 9-206019).

SUMMARY OF INVENTION

Technical Problem

When taking the distribution or the like into consideration, long storage time is preferable. Therefore, when storing leafy vegetables in the raw state, a method which can store them for a longer period of time than the bag described in Japanese Patent Laid Open No. 6-199385 1 is desired. In addition, a conventional method of storing tea leaves in a dried state is intended to improve the storability after processing as a tea, and a method for improving the storability of the tea leaves before processing has not been known until now.

The present invention was made in view of such a problem and it is aimed at providing a polyphenol increasing agent for harvested tea leaves, a polyphenol and amino acid increasing agent for harvested tea leaves, a resin pellet, a harvested tea leaf storage sheet, and a method for manufacturing a harvested tea leaf storage sheet which can improve the storability of harvested tea leaves.

Solution to Problem

In order to achieve the above object, the polyphenol increasing agent for harvested tea leaves according to the present invention is characterized in that it comprises proanthocyanidins and trehalose.

The polyphenol increasing agent according to the present invention can increase lactic acid bacteria by inhibiting putrefaction and as a result, it can promote lactic acid fermentation to increase polyphenols contained in the plant leaves. Thus, the polyphenol increasing agent for leaves according to the present invention can improve the storability of harvested tea leaves.

The polyphenol and amino acid increasing agent for harvested tea leaves according to the present invention can promote lactic acid fermentation to increase polyphenols contained in the plant leaves and to increase branched-chain amino acids and essential amino acids contained in the plant leaves, thereby achieving long-term storage of the plant leaves, high-functionality and enhancement of nutrients.

The polyphenol increasing agent for harvested tea leaves according to the present invention and the polyphenol and amino acid increasing agent for harvested tea leaves according to the present invention preferably comprise the proanthocyanidins and the trehalose at a weight ratio of 1:15 to 1:60. In this case, increase promotion effect of polyphenols is particularly high and storability of the plant leaves is high.

The polyphenol increasing agent for harvested tea leaves and the polyphenol and amino acid increasing agent for harvested tea leaves according to the present invention may be used in any way as long as they are used to store the plant leaves. For example, they are used by being applied to a sheet for wrapping leaves or a container for housing leaves. In the polyphenol increasing agent for harvested tea leaves and the polyphenol and amino acid increasing agent for harvested tea leaves according to the present invention, trehalose may be any of three isomers, α, α form, α, β form or β, β form. In addition, raw materials of proanthocyanidins are may be grape seeds, black soybeans but other raw materials and proanthocyanidins derived from grape seeds are particularly preferred.

The harvested tea leaf storage sheet according to the present invention is characterized by processing the resin pellet comprising the polyphenol increasing agent for harvested tea leaves according to the present invention or the polyphenol and amino acid increasing agent for harvested tea leaves according to the present invention into a sheet.

The harvested tea leaf storage sheet according to the present invention can improve the storability of plant leaves by being used in packaging of the tea leaves, because it comprises the polyphenol increasing agent for harvested tea leaves according to the present invention or the polyphenol and amino acid increasing agent for harvested tea leaves according to the present invention. In addition, the harvested tea leaf storage sheet can increase polyphenols or amino acids contained in the plant leaves. In order to further improve the storability, after wrapping the plant leaves, the inside air may be removed. The harvested tea leaf storage sheet according to the present invention may be bag-shaped, box-shaped, folded, rolled or any other shape.

The harvested tea leaf storage sheet according to the present invention may be produced by melting a resin pellet comprising the polyphenol increasing agent for harvested tea leaves according to the present invention or the polyphenol and amino acid increasing agent for harvested tea leaves according to the present invention at 150 to 200° C. and subsequently processing it into a sheet of 20 to 50 μm thick. The resin pellet is preferably formed by mixing the polyphenol increasing agent for harvested tea leaves or the polyphenol and amino acid increasing agent for harvested tea leaves according to the present invention with a resin composed of one or more of polyethylene, polypropylene, polyvinyl chloride, polystyrene, polyamide, polyacetal, polyethylene terephthalate, polycarbonate, ethylene-acetate copolymer and ABS resin.

In addition, the harvested tea leaf storage sheet according to the present invention may be produced by including the polyphenol increasing agent for harvested tea leaves according to the present invention or the polyphenol and amino acid increasing agent for harvested tea leaves according to the present invention in a sheet having air permeability. The harvested tea leaf storage sheet according to the present invention may contain additives such as salt, other minerals, an antibacterial agent, an antifungal agent, a deodorant ant the like.

The harvested tea leaf storage sheet according to the present invention may be produced by including proanthocyanidins and trehalose in a sheet having air permeability, proanthocyanidins may be included in the sheet at a ratio of 250 to 300 mg/m$^2$ and trehalose may be included in the sheet at a ratio of 5 g/m$^2$.

Since harvest time of tea leaves is a short period of time, it is necessary to perform post-harvest processing work in a short period of time before the tea leaves corrode. For this reason, work is concentrated on a certain period of time and it has been difficult to ensure a stable work force throughout the year. In addition, in order to ensure a stable work force throughout the year, it is necessary to constantly perform processing and production of tea throughout the year and to store the tea leaves before processing without corroding them. The polyphenol increasing agent for harvested tea leaves, the polyphenol and amino acid increasing agent for harvested tea leaves and the harvested tea leaf storage sheet according to the present invention can improve the storability of tea leaves so that it is possible to constantly perform processing and production of tea throughout the year by utilizing the stored tea leaves. In addition, this makes it possible to ensure a stable work force throughout the year.

Advantageous Effects of Invention

According to the present invention, a polyphenol increasing agent for harvested tea leaves, a polyphenol and amino acid increasing agent for harvested tea leaves, a resin pellet, a harvested tea leaf storage sheet, and a method for manufacturing a harvested tea leaf storage sheet which can improve the storability of harvested tea leaves can be provided.

DESCRIPTION OF EMBODIMENTS

A polyphenol increasing agent for plant leaves, a polyphenol and amino acid increasing agent for plant leaves, a resin pellet, a plant leaf storage sheet, and a method for manufacturing a plant leaf storage sheet according to an embodiment of the present invention will be described below based on the drawings.

Example 1

Tests of the storability for tea leaves and the change of amino acids using the plant leaf storage sheet according to the embodiment of the present invention were conducted. The plant leaf storage sheet to be used here was produced by including a polyphenol increasing agent for plant leaves comprising proanthocyanidins and trehalose (a polyphenol and amino acid increasing agent for plant leaves) in a sheet having air permeability. The plant leaf storage sheet was manufactured by the following method. First, an aqueous solution was prepared by dissolving 3 g of grape seed-derived water-soluble extracted polyphenols (the content of proanthocyanidins is 95 wt %, trade name "Leuco Select" from Indena S.p.A) and 5 g of trehalose in 1000 ml of distilled water. Then, a mesh non-woven fabric (40 cm×40 cm in size, weight per area of 50 g/m$^2$) was immersed in the solution and subsequently, dried in a hot-air dryer at 120° C. for 2 hours.

Two types of plant leaf storage sheets were prepared, i.e. a plant leaf storage sheet which was made to have the content of proanthocyanidins of 250 mg/m$^2$ per non-woven fabric and the content of trehalose of 5 mg/m$^2$ per non-woven fabric (hereinafter referred to as "standard concentration present invention sheet") and a plant leaf storage sheet which was made to have the content of proanthocyanidins of 125 mg/m$^2$ per non-woven fabric and the content of trehalose of 2.5 mg/m$^2$ per non-woven fabric (hereinafter referred to as "½ concentration of present invention sheet"). In addition, tea leaves harvested in late April 2009 in Shizuoka Prefecture were used as tea leaves for the tests.

Storage Test of Tea Leaves

Tea leaves were wrapped with the plant leaf storage sheet, put into a zippered bag, and refrigerated at 4° C. for 15 days. In addition, as a comparative test, unwrapped tea leaves put into a zippered bag (hereinafter referred to as "initial"), tea leaves put into a zippered bag wrapped with a non-woven fabric (hereinafter referred to as "non-woven fabric control) and tea leaves put into a zippered bag wrapped with a non-woven fabric sheet which was formulated with sorbitol instead of trehalose of the standard concentration present invention sheet (hereinafter referred to as "sorbitol sheet") were stored under the same conditions.

As a result, in the initial and the non-woven fabric control, it was confirmed that browning parts of tea leaves turned putrid to be in a melted state, emitting a smell like a rotten dust cloth. In contrast, in ½ concentration of the present invention sheet and the standard concentration present invention sheet, it was confirmed that browning tea leaves were mixed in tea leaves, but the browning leaves also had elasticity and another smell was slightly mixed in the smell of tea leaves. In view of this smell, it is believed that in the tea leaves stored by using the plant leaf storage sheet, lactic acid fermentation is progressing. In addition, in the sorbitol sheet, it was confirmed that browning tea leaves were mixed in tea leaves, but the browning leaves also had elasticity and there was only the smell of tea leaves. From this result, it is believed that trehalose is required for lactic acid fermentation and proanthocyanidins act as an agent for improving the storability.

Measurement of the Total Amount of Amino Acids

For each sample that was subjected to the storage test, amino acids were measured by the ninhydrin reaction method. As a ninhydrin reagent, a ninhydrin coloring solution set for L-8900 (produced by Wako Pure Chemical Industries, Ltd.) was used. Measurement samples were prepared by adding 50 µl of each sample, 50 µl of coloring solution A and 50 µl of coloring solution B to a 96-well multi-plate, followed by stirring, and subsequently heating in an oven at 80° C. for 5 minutes. This was measured at 550 nm using a multi-plate reader (product name "MTP-450", from CORONA ELECTRIC Co., Ltd.). A calibration curve was made using one made by mixing amino acid mixture standard solution AN-II type and B type (containing 2 nmol of each amino acid of 40 kinds of amino acids).

Figure 1:
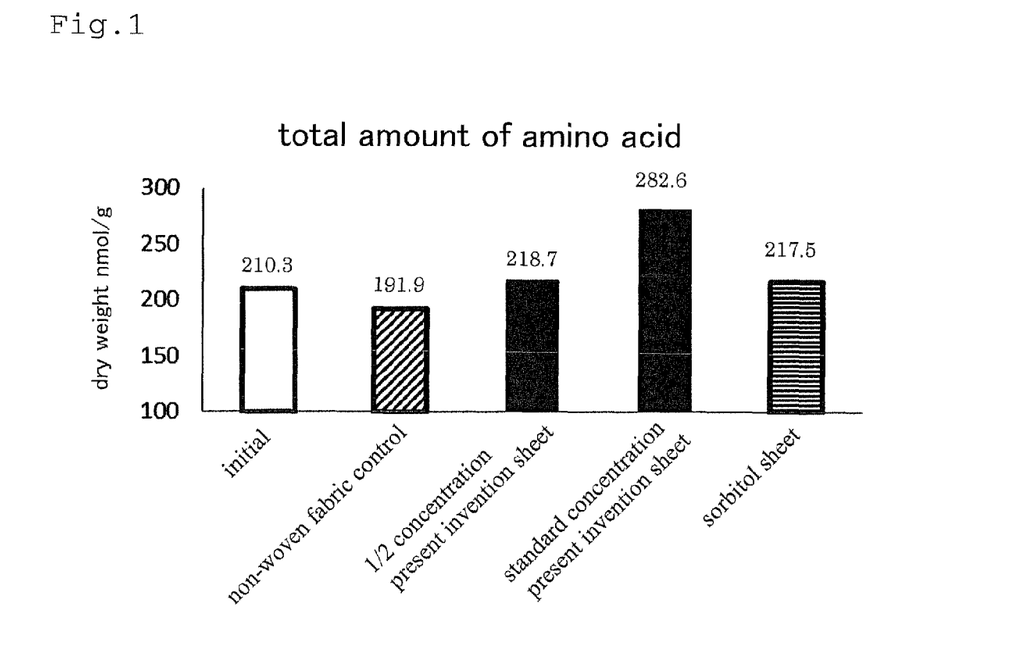
FIG. 1 is a graph showing the results of measuring the total amount of amino acids of samples stored by wrapping tea leaves with the plant leaf storage sheet according to an embodiment of the present invention (½ concentration present invention sheet, standard concentration present invention sheet) and samples stored in other ways (initial, non-woven fabric control, sorbitol sheet). The measurement of each sample is conducted three times (N=3) and the numerical values in the graph show mean values thereof.

The total amount of amino acids per 1 g of tea leaves dry weight for each sample was calculated based on a value measured by the ninhydrin reaction and the water content measured by a moisture meter. The measurement results are shown in FIG. 1. As shown in FIG. 1, it was confirmed that the total amount of amino acids of the standard concentration present invention sheet was highest and increased by 34% relative to the initial value. In the case where the same amount of sorbitol was formulated instead of trehalose (sorbitol sheet), increase in total amino acids was not observed.

Example 2

Tests of the storability for mulberry leaves as well as the increase in polyphenols and the change of amino acids as verification of an added value by storage ripening using the plant leaf storage sheet according to an embodiment of the present invention were conducted. The plant leaf storage sheet to be used here was produced in the same producing method as Example 1 so that it would have the propanthocyanidins content of 300 mg/m$^2$ per non-woven fabric and the trehalose content of 5 mg/m$^2$ per non-woven fabric. In addition, mulberry leaves harvested in October 2009 in Kitakami City, Iwate Prefecture were used as samples for the tests.

Storability of Mulberry Leaves

Mulberry leaves were wrapped with the plant leaf storage sheet and stored in a place of 4° C. for 40 days (hereinafter referred to as "sheet-covered sample"). In addition, as a comparative test, unwrapped mulberry leaves (hereinafter referred to as "control sample") were stored in a place of 4° C. for 40 days.

As a result, compared to the initial state before storage, in both the control sample and the sheet-coated sample, browning tea leaves were observed. In addition, it was observed that in the control sample, something like mold was attached to mulberry leaves and putrid mulberry leaves without flexibility were mixed in the leaves, while in the sheet-covered sample, there were very few leaves with mold-like substances attached thereto and mulberry leaves themselves had flexibility.

Thus, it was confirmed that the plant leaf storage sheet inhibits corrosion of mulberry leaves to improve the storability of the mulberry leaves before processing by wrapping them. The plant leaf storage sheet is believed to inhibit corrosion of mulberry leaves by the mechanism that trehalose absorbs ethylene released from mulberry leaves and proanthocyanidins inhibit oxidation action of excessively produced ethylene oxide. Using mulberry leaves stored by wrapping them with the plant leaf storage sheet makes it possible to constantly perform processing and production of mulberry leaf tea throughout the year, thereby ensuring a stable work force throughout the year.

Measurement of Polyphenol 4 volumes of ethanol relative to wet weight of mulberry leaves were added to each sample of the sheet-coated sample and the control sample. The mixture was ground, stirred and centrifuged to provide a supernatant, which was mulberry leaf polyphenol extract. The polyphenol content was measured by Folin Ciocalteu's method which is a colorimetric assay, using this mulberry leaf polyphenol extract.

The measurement procedure is as follows: First, 10 µl of each mulberry leaf polyphenol extract of the sheet-coated sample and the control sample, 10 µl of two fold-diluted Folin Ciocalteu's, 160 µl of reagent distilled water and finally 20 µl of saturated aqueous sodium carbonate solution to prevent data errors were added to a 96-well multi-plate which was used as a test vessel. After stirring, they were allowed to react at room temperature for 30 minutes. The polyphenol content was calculated as gallic acid equivalent at a measurement wavelength of 620 nm using a multi-plate reader (product name "DTX-800", from Beckman Coulter, Inc.) as a measuring instrument.

Figure 2:
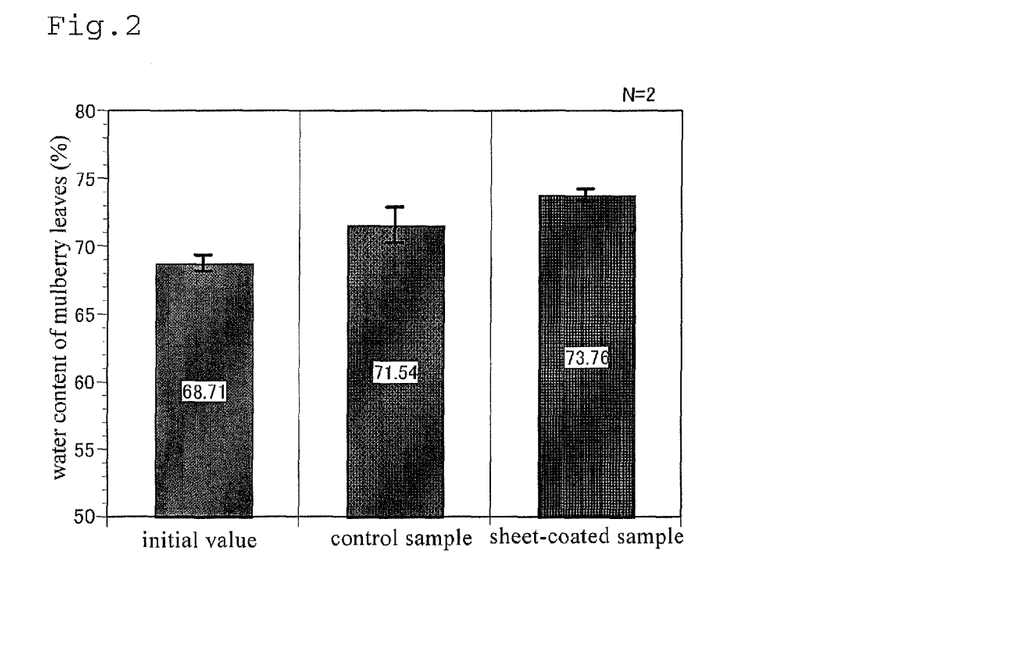
FIG. 2 is a graph showing the results of measuring the water content of a sheet-covered sample stored by wrapping mulberry leaves with the plant leaf storage sheet according to an embodiment of the present invention and a control sample with mulberry leaves stored unwrapped. The measurement of each sample is conducted two times (N=2) and the numerical values in the graph show mean values thereof.

First, for the mulberry leaves of each of the sheet-coated sample and the control sample, their water contents were compared. The results are shown in FIG. 2. As shown in FIG. 2, though the sheet-coated sample contained more water than the initial state compared to the control sample, as a result of statistically significant differences between water contents of each sample analyzed by Turkey-Kramer multiple comparison analysis at the 5% significance level, no significant difference was observed.

Figure 3:
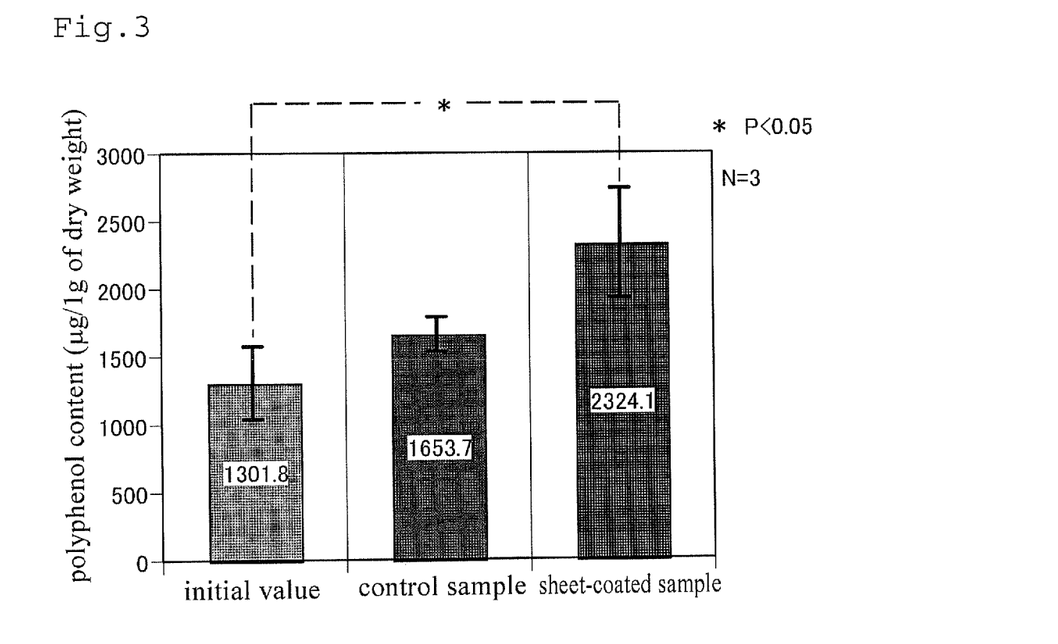
FIG. 3 is a graph showing the results of measuring the polyphenol content of a sheet-covered sample stored by wrapping mulberry leaves with the plant leaf storage sheet according to an embodiment of the present invention and a control sample with mulberry leaves stored unwrapped. The measurement of each sample is conducted three times (N=3), the numerical values in the graph show mean values thereof and * represents "significant difference (P<0.05)".

Then, the polyphenol content per 1 g of mulberry leaves dry weight of the mulberry leaves of each of the sheet-coated sample and the control sample is shown in FIG. 3 with an initial value at −80° C. As shown in FIG. 3, in both the sheet-coated sample and the control sample, it was confirmed that polyphenols increased from the initial value. In addition, it was confirmed that the sheet-coated sample had a larger increase in polyphenols compared to the control sample and the poluphenols increased 1.8 times the initial value and 1.4 times the control sample. As a result of statistically significant differences between polyphenol contents of each sample analyzed by Turkey-Kramer multiple comparison analysis at the 5% significance level, a significant difference was observed between the initial value and the sheet-coated sample.

Thus, it was confirmed that the plant leaf storage sheet promoted the increase in polyphenols contained in mulberry leaves by wrapping the mulberry leaves. This is believed to be because the plant leaf storage sheet inhibits putrefactive bacteria to increase lactic acid bacteria and as a result, lactic acid fermentation proceeds to increase polyphenols.

Measurement of DPPH Radical Scavenging Activity

In order to examine the antioxidative activity of polyphenols, the DPPH radical scavenging activity was measured by DPPH method. The DPPH radical scavenging activity was calculated with 80% ethanol solution being 100%. The measurement was carried out at a measurement wavelength of 520 nm using a 96-well multi-plate as a measuring container and a multi-plate reader (product name "DTX-800", from Beckman Coulter, Inc.) as a measuring instrument.

First, 50 µl of each mulberry leaf polyphenol extract of the sheet-coated sample and the control sample (if dilution is needed, diluted in 80% ethanol), 80 of 100 mM Tris-HCl (pH7.5), 40 µl of reagent distilled water and finally 40 µl of DPPH ethanol solution (5 mM DPPH, 100% ethanol) were added to each well, followed by stirring, to react for 20 minutes and a resultant was measured. An extracted sample replaced by 80% ethanol was used as blank.

Figure 4:
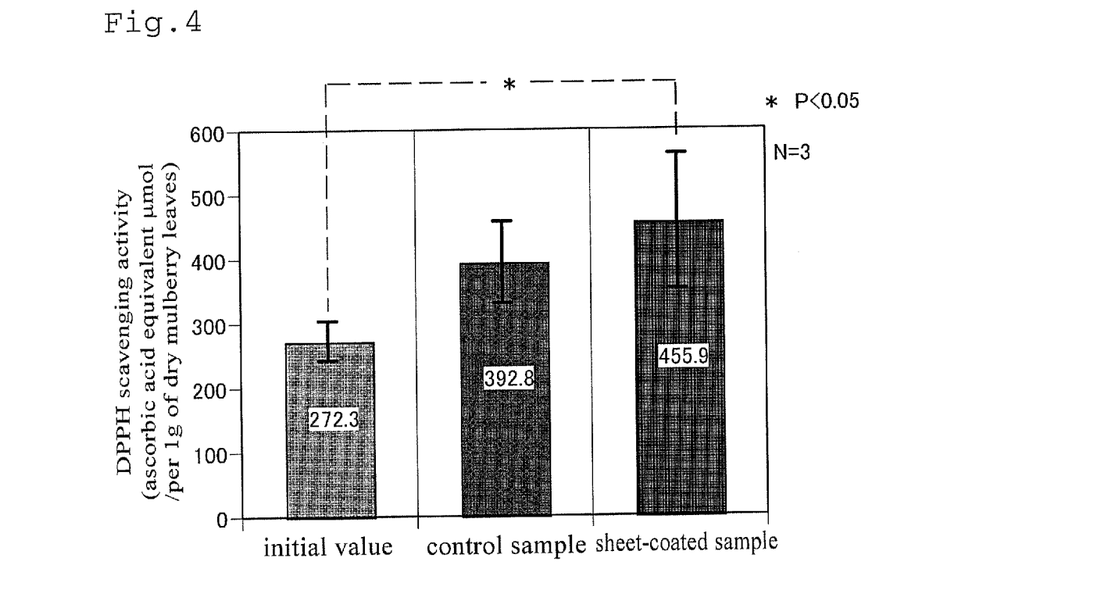
FIG. 4 is a graph showing the results of measuring the DPPH radical scavenging activity (DPPH scavenging activity) of a sheet-covered sample stored by wrapping mulberry leaves with the plant leaf storage sheet according to an embodiment of the present invention and a control sample with mulberry leaves stored unwrapped. The measurement of each sample is conducted three times (N=3), the numerical values in the graph show mean values thereof and * represents "significant difference (P<0.05)".

The measurement results of DPPH radical scavenging activity of the sheet-coated sample and the control sample were shown in FIG. 4. As shown in FIG. 4, it was confirmed that the DPPH radical scavenging activity per 1 g of mulberry leaves increased from the initial value in both the sheet-coated sample and the control sample. In addition, it was confirmed that the sheet-coated sample had a larger increase in the DPPH radical scavenging activity compared to the control sample and it increased 1.7 times the initial value and 1.2 times the control sample. As a result of statistically significant differences between DPPH radical scavenging activities of each sample analyzed by Turkey-Kramer multiple comparison analysis at the 5% significance level, a significant difference was observed between the initial value and the sheet-coated sample.

Thus, it was confirmed that the antioxidative capacity using DPPH radical scavenging activity as an index of the sheet-coated sample per mulberry leaf was highest. It can be said from this that the plant leaf storage sheet can further increase the antioxidative capacity of polyphenols contained in mulberry leaves by wrapping the mulberry leaves.

Amino Acid Analysis

The sheet-coated sample was analyzed for amino acid. For comparison, commercially available mulberry tea (trade name "Saraki mulberry tea") was also analyzed for amino acid. In addition, in order to check the initial state, raw mulberry leaves kept in a freezer were also analyzed for amino acid.

Figure 5:
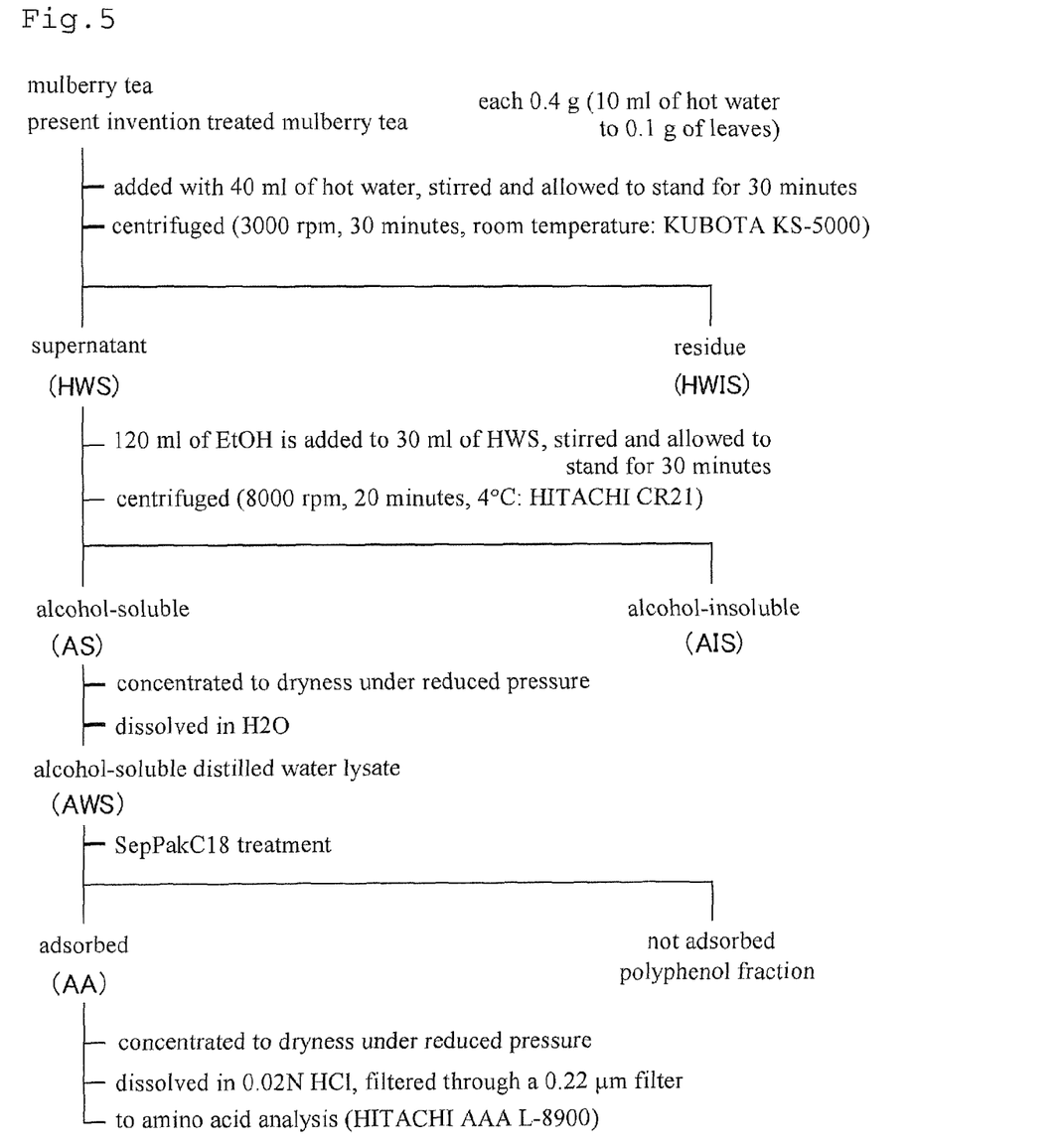
FIG. 5 is a flow showing a method of producing samples for amino acid analysis of a sheet-covered sample stored by wrapping mulberry leaves with the plant leaf storage sheet according to an embodiment of the present invention and mulberry tea.

Samples for analysis were prepared as follows. First, as shown in FIG. 5, the sheet-coated sample and mulberry tea were coarsely ground and 0.4 g of each of them was fractionated, added with 40 ml of hot water, followed by stirring, and subsequently allowed to stand for 30 minutes. This was centrifuged to provide a water-soluble fraction (supernatant) which was a hot water extract (HWS). Thirty ml of each HWS was fractionated, added with 120 ml of ethanol followed by stirring, and subsequently allowed to stand for 30 minutes. These were centrifuged to provide supernatants which were alcohol-soluble fractions (AS). One hundred and thirty ml of each AS fraction was concentrated to dryness under reduced pressure and dissolved in 13 ml of distilled water to provide an alcohol-soluble hydrolysate (AWS).

Figure 6:
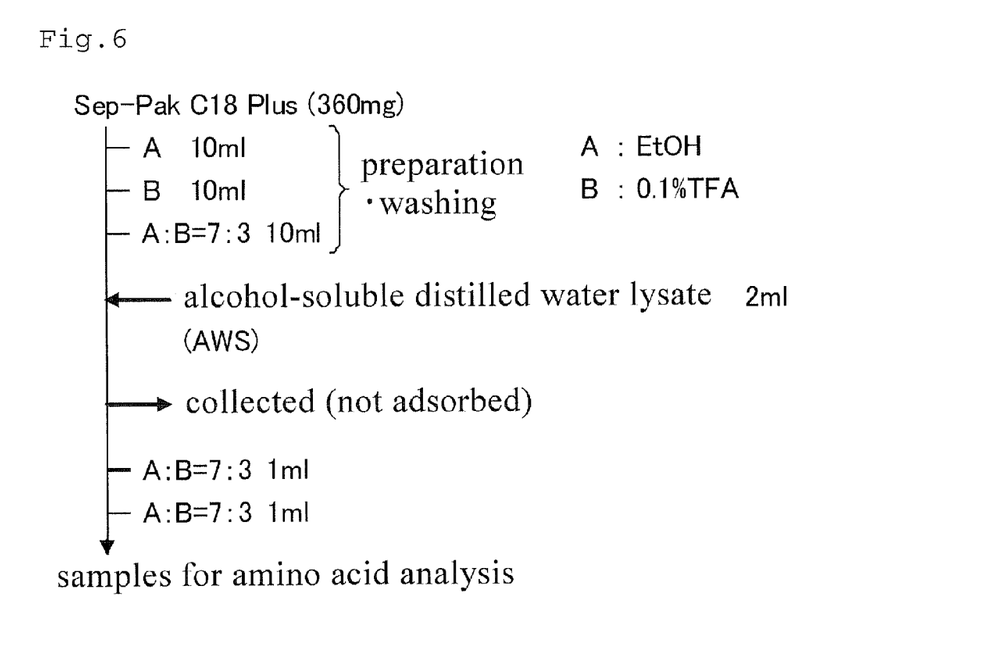
FIG. 6 is a flow showing the Sep-Pak C18 procedure in the method of producing samples for amino acid analysis shown in FIG. 5.

Next, as shown in FIG. 6, 2 ml of each AWS fraction was subjected to Sep-Pak C18 Plus (360 mg) and an adsorbate was eluted with 2 ml of a solution with ethanol:0.1% TFA=7:3. As shown in FIG. 5, the adsorbed fraction was concentrated to dryness, dissolved in 0.02 N HCl and filtered through a 0.22 µm filter (MILLIPORE Co.) to provide a sample for amino acid analysis.

Figure 7:
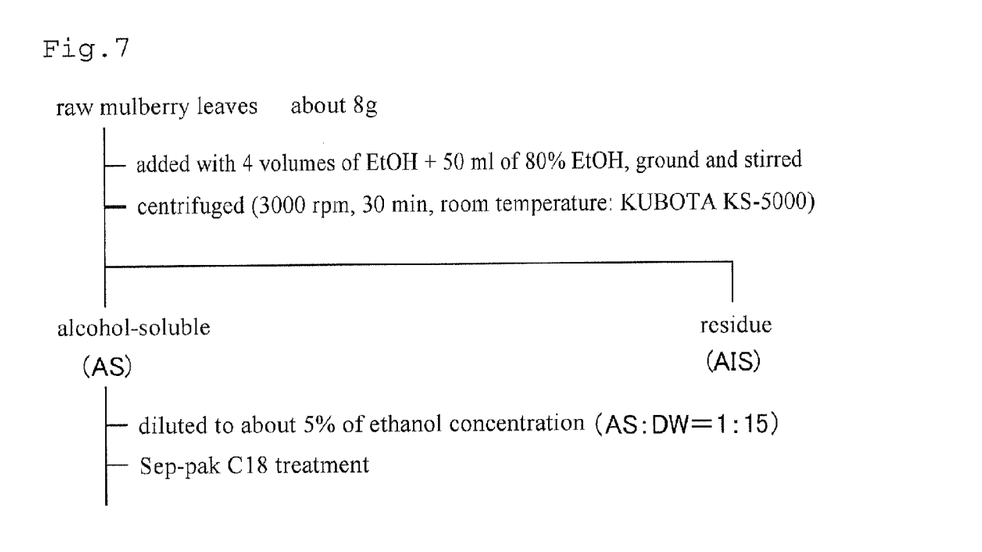
FIG. 7 is a flow showing a method of producing a sample for amino acid analysis of raw mulberry leaves.

As shown in FIG. 7, about 8 g of raw mulberry tea was fractionated, added with 4 volumes of ethanol and 100 ml of 80% ethanol (for agitation), and ground and stirred using a mixer (product name "Force Mill": from Shimadzu GLC Ltd.). This was centrifuged to provide an alcohol-soluble solution which was an alcohol extract (AS). Two ml was taken from this AS fraction, added with 30 ml of distilled water to about 5% of alcohol concentration, and subjected to the operation shown in FIG. 6 using Sep-Pak C18. The adsorbed fraction was concentrated to dryness, dissolved in 0.02 N HCl and filtered through a 0.22 µm filter (MILLIPORE Co.) to provide a sample for amino acid analysis as with FIG. 5.

The amino acid was measured by the ninhydrin reaction method using each prepared sample for amino acid analysis. L-8900 ninhydrin reagent set for amino acid analysis and an amino acid analyzer (product name "L-8900", from Hitachi High-Technologies Co., Ltd.) were used for measuring the amino acid content. The reaction condition was as follows. Zero point one ml of analytical sample, 1 ml of nynhidrin reagent, 1 ml of ninhydrin buffer were mixed in a test tube and were allowed to react in a boiling water bath for 3 minutes. This was measured at 570 nm, determining the concentration.

Figure 8:
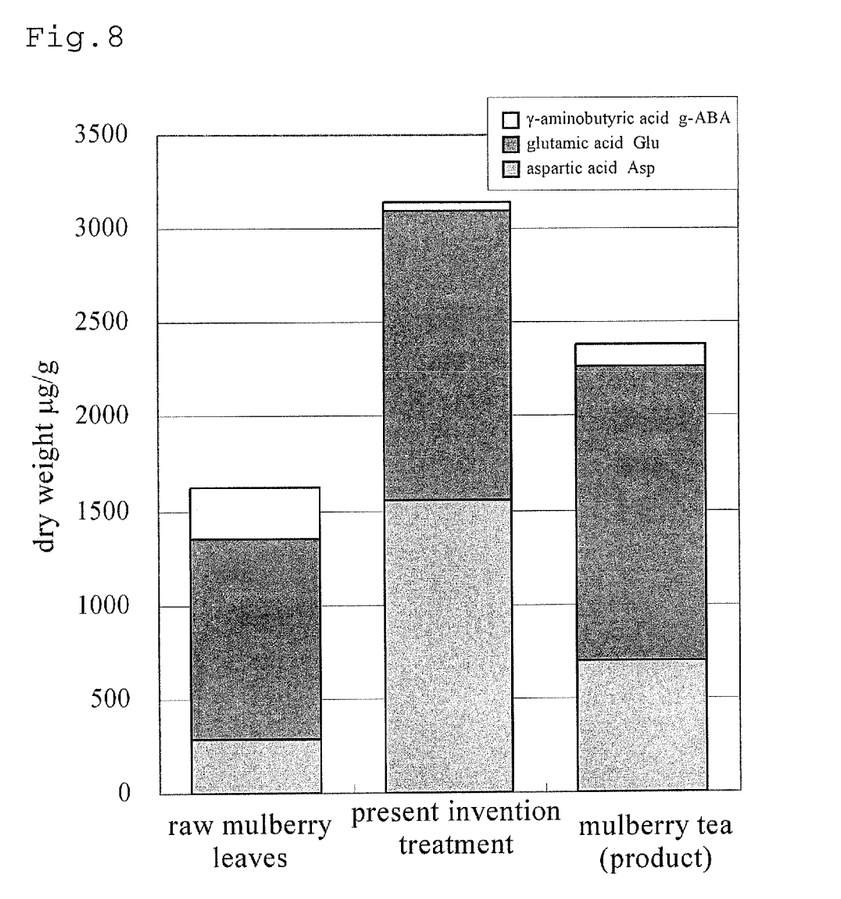
FIG. 8 is a graph showing the amino acid content of GABA metabolic system of a sheet-covered sample stored by wrapping mulberry leaves with the plant leaf storage sheet according to an embodiment of the present invention, mulberry tea and raw mulberry leaves.
Figure 9:
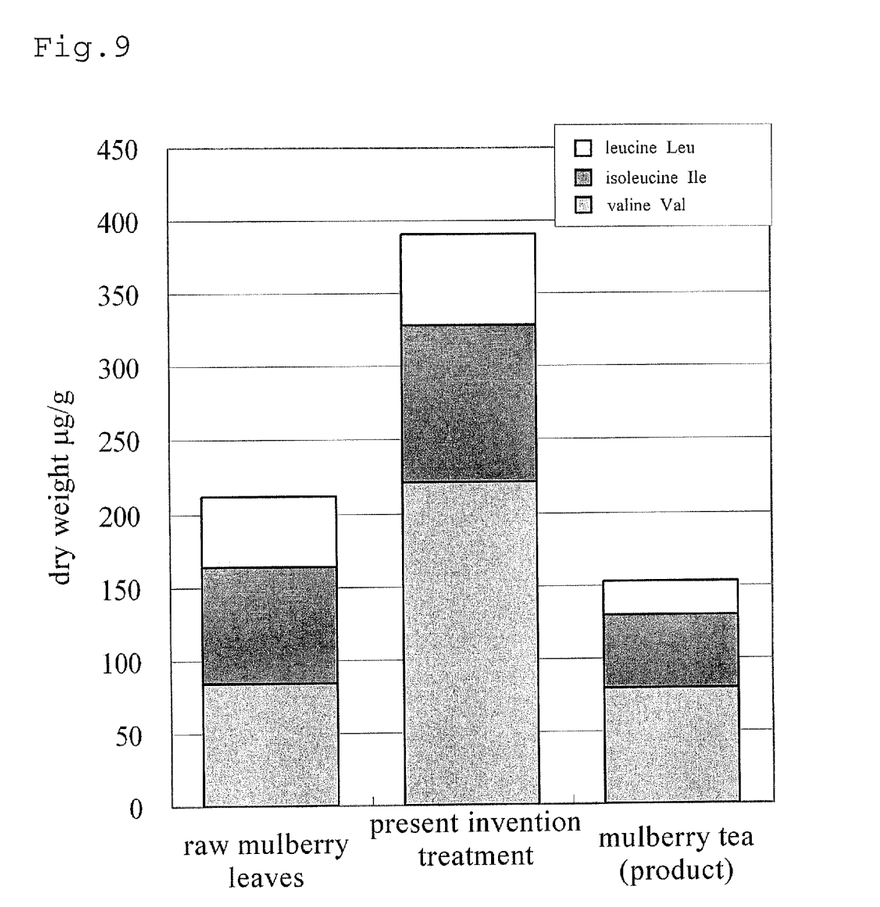
FIG. 9 is a graph showing the branched-chain amino acid content of a sheet-covered sample stored by wrapping mulberry leaves with the plant leaf storage sheet according to an embodiment of the present invention, mulberry tea and raw mulberry leaves.
Figure 10:
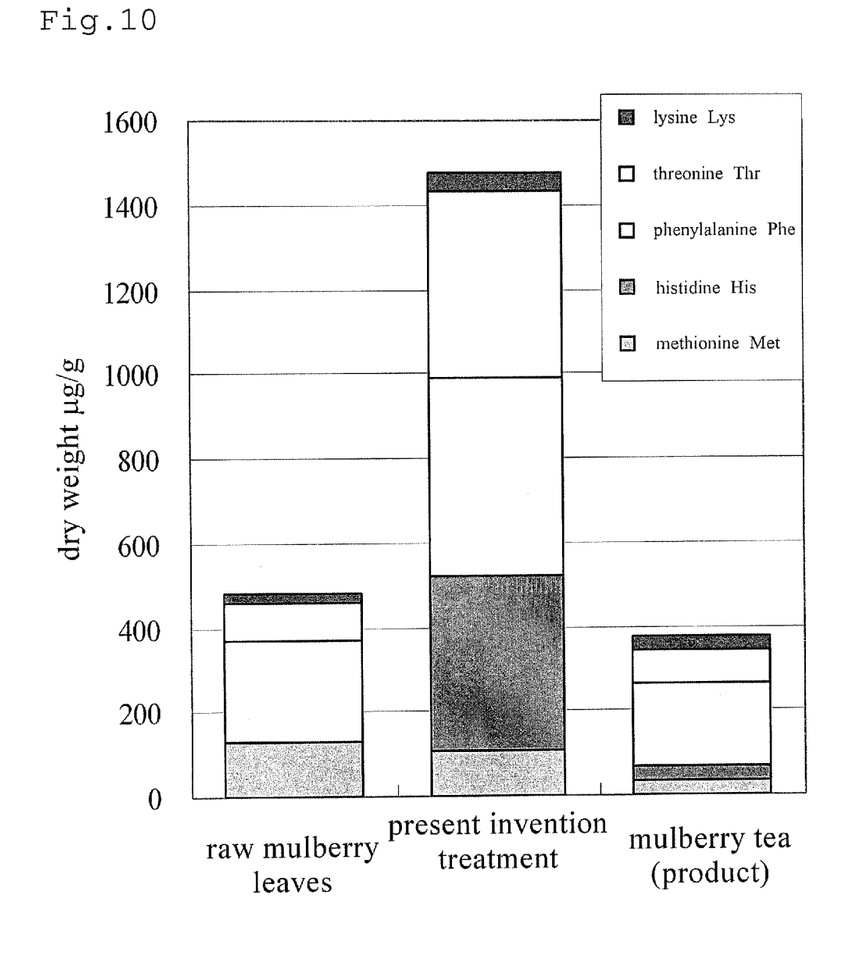
FIG. 10 is a graph showing the essential amino acid content of a sheet-covered sample stored by wrapping mulberry leaves with the plant leaf storage sheet according to an embodiment of the present invention, mulberry tea and raw mulberry leaves.

For the sheet-coated sample, mulberry tea and raw mulberry leaves, two samples for amino acid analysis were prepared, respectively. The prepared samples were measured for various amino acids contents to calculate the contents per 1 g of solid, and mean values of the measurement results of two samples for each of the sheet-coated sample ("present invention treatment"), mulberry tea and raw mulberry leaves were calculated. The results are shown in Table 1, FIGS. 8, 9 and 10.

TABLE 1

| classification | | amino acid constituent name | | raw mulberry leaves (μg) | present invention treatment mulberry leaves (μg) | mulberry tea (product) (μg) | present invention treatment increase and decrease | present invention/ raw leaves content ratio | essential amino acid |
|---|---|---|---|---|---|---|---|---|---|
| GABA metabolic system | acidic amino acid | aspartic acid | Asp | 285.9 | 1552.7 | 696.0 | increase | 5.4 | |
| | | glutamic acid | Glu | 1062.9 | 1547.4 | 1566.6 | increase | 1.5 | |
| | | γ-aminobutyric acid | g-ABA | 275.7 | 45.1 | 116.4 | decrease | 0.2 | |
| | sulfur-containing amino acid | methionine | Met | 130.2 | 108.8 | 36.2 | decrease | 0.8 | o |
| | | cystein | Cys | 0.0 | 0.0 | 3.0 | | — | |
| BCAA | branched-chain amino acid | valine | Val | 84.7 | 221.0 | 79.5 | increase | 2.6 | o |
| | | isoleucine | Ile | 78.1 | 106.9 | 49.7 | increase | 1.4 | o |
| | | leucine | Leu | 49.2 | 63.4 | 23.6 | increase | 1.3 | o |
| | aliphatic amino acid | glycine | Gly | 21.1 | 44.5 | 7.6 | increase | 2.1 | |
| | | alanine | Ala | 110.2 | 290.3 | 130.7 | increase | 2.6 | |
| | aromatic amino acid | histidine | His | 0.0 | 410.3 | 30.7 | increase | | o |
| | | tyrosine | Tyr | 56.7 | 81.7 | 43.4 | increase | 1.4 | |
| | | phenylalanine | Phe | 237.0 | 470.6 | 193.8 | increase | 2.0 | o |
| | hydroxy amino acid | threonine | Thr | 90.6 | 443.8 | 82.6 | increase | 4.9 | o |
| | | serine | Ser | 112.0 | 392.4 | 175.5 | increase | 3.5 | |
| | | carnitine | Car | 24.9 | 1.6 | 4.6 | decrease | 0.1 | |
| | basic amino acid | lysine | Lys | 24.4 | 41.4 | 30.4 | increase | 1.7 | o |
| | | arginine | Arg | 40.4 | 50.8 | 96.8 | increase | 1.3 | |
| | imino aicd | proline | Pro | 708.6 | 90.5 | 206.8 | decrease | 0.1 | |
| | hydroxylated amino acid | hydroxylysine | Hylys | 167.6 | 0.0 | 0.0 | decrease | 0.0 | |
| | | hydroxyproline | Hypro | 44.8 | 14.6 | 0.0 | decrease | 0.3 | |
| | pyrimidine base | cytosine | Cit | 5.8 | 19.8 | 5.7 | increase | 3.4 | |
| | dicarboxylic acid | sarcosine | Sar | 10.1 | 17.3 | 15.9 | increase | 1.7 | |
| | | α-adipic acid | a-AAA | 8.1 | 108.0 | 28.7 | increase | 13.3 | |
| | | α-aminobutyric acid | a-ABA | 14.1 | 14.4 | 18.8 | | 1.0 | |
| | | β-aminoisobutyric acid | b-AiBA | 10.3 | 51.5 | 7.9 | increase | 5.0 | |
| | β-amino acid | β-alanine | b-Ala | 34.8 | 23.9 | 24.8 | | 0.7 | |
| | cystein precursor | cystathionine | Cysthi | 0.0 | 31.7 | 5.1 | increase | | |
| | Dipeptide | 1-methylhistidine | 1Mehis | 0.0 | 0.2 | 0.0 | | | |
| | | 3-methylhistidine | 3Mehis | 17.1 | 11.0 | 14.1 | | 0.6 | |
| | serine phosphate | phosphoserine | P-Ser | 23.4 | 208.5 | 66.3 | increase | 8.9 | |
| | amino alcohol | phosphoethanolamine | PEA | 5.9 | 70.1 | 0.0 | increase | 11.9 | |
| | | ethanolamine | EOHNH2 | 149.6 | 47.3 | 21.3 | decrease | 0.3 | |
| | non-amino acid | ammonia | NH3 | 122.3 | 55.9 | 18.1 | decrease | 0.5 | |
| | | urea | Urea | 185.1 | 0.0 | 0.0 | decrease | 0.0 | |
| | | total | | 3561.1 | 6463.9 | 3761.3 | increase | 1.8 | |

The following was confirmed by amino acid analysis. As shown in Table 1, FIGS. 8, 9 and 10, by wrapping mulberry leaves with the plant leaf storage sheet (present invention treatment), compared to raw mulberry leaves which are considered to indicate the initial state before storage, aspartic acid and glutamic acid, which are raw materials for GABA metabolism, were increased, but GABA (g-ABA) was decreased. Sulfur-containing amino acids which control antioxidative action and protein metabolism of organisms had no significant differences between raw mulberry leaves and the present invention treatment. Branched-chain amino acids (BCAA) which have a function of promoting energy combustion and synthesis of muscle fibers such as, valine, leucine, isoleucine were increased by the present invention treatment. Essential amino acids such as, histidine, phenylalanine, threonine, lysine were increased by the present invention treatment. The total amino acids content of mulberry leaves subjected to the present invention treatment became about 1.8 times that of raw mulberry leaves.

It is known that in tea leaves and mulberry leaves, glutamic acid is produced from aspartic acid and GABA is produced by decarboxylation of glutamic acid under an anaerobic condition. As shown in Table 1 and FIG. 8, when stored in the plant leaf storage sheet, GABA was decreased compared to before the start of storage, but aspartic acid and glutamic acid, which were raw materials, were increased. One possibility of decreasing of GABA may be that a reaction with amino acid transferase has proceeded. That is, the possibility that a reaction which produces glutamic acid+succinic semialdehyde from GABA+α-ketoglutaric acid has proceeded by g-aminobutyric acid aminotransferase can be considered. However, comparing reduction of GABA and increases of aspartic acid, glutamic acid, the increases were clearly larger. In addition, in the mulberry leaves stored using the plant leaf storage sheet, many kinds of amino acids such as branched-chain amino acids, acidic amino acids and essential amino acids were increased. Though the mechanism of these increases is not clear, it is believed that fermentation of mulberry leaves proceeded to decompose proteins, which caused the increases of the amino acids or that fungi generated them during fermentation.

Thus, by storing mulberry leaves using the plant leaf storage sheet, it is possible to achieve long-term storage, high functionality and enhancement of nutrients and mulberry leaves can be raw materials for tea with high functionality.

Example 3

Tests of the change of amino acids when tea leaves were stored using the plant leaf storage sheet according to an embodiment of the present invention were conducted. As the raw materials of the plant leaf storage sheet to be used here, a polyphenol increasing agent for plant leaves comprising proanthocyanidins and trehalose (a polyphenol and amino acid increasing agent for plant leaves) and a resin pellet formed by mixing polypropylene or polyethylene melted at 150 to 200° C. were used. The plant leaf storage sheet was produced by melting this resin pellet at 150 to 200° C., subsequently processing it into a sheet of 20 to 50 μm thick. The resin pellet and the plant leaf storage sheet contain 0.2 wt % of a polyphenol increasing agent for plant leaves comprising trehalose and proanthocyanidins at a weight ratio of 20:1. A bag made of the plant leaf storage sheet using polypropylene (hereinafter referred to as "treated PP") and a bag made of the plant leaf storage sheet using polyethylene (hereinafter referred to as "treated PE") were used in the tests. In addition, mulberry leaves harvested in 2010 in Kitakami City, Iwate Prefecture were used in the tests.

About 30 g of mulberry leaves were put into each bag of the treated PP and the treated PE. In addition, as a comparative test, about 30 g of mulberry leaves were put into each of a commercially available bag made of polypropylene (hereinafter referred to as "untreated PP") and a commercially available bag made of polyethylene (hereinafter referred to as "untreated PE"). These bags were refrigerated at 4° C. with their bag mouths open. The retention period of the treated PP and the untreated PP was 20 days and that of the treated PE and the untreated PE was 22 days.

Amino Acid Analysis

Samples for amino acid analysis were prepared in the same manner as Example 2, as follows. First, about 7.5 g wet weight of mulberry leaves were added with 4 volumes of ethanol (about 30 ml) and 30 ml of 80% ethanol, followed by grinding and stirring, and centrifuged to provide a supernatant which was an extract. This was prepared in triplicate for each sample.

Next, 1 ml of AWS fraction of each extract was subjected to Sep-Pak C18 Plus (360 mg) and adsorbate was eluted with 2 ml of a solution with ethanol:0.1% TFA=7:3. In addition, 2 ml was taken from AS fraction of raw mulberry leaves, added with 30 ml of distilled water to about 5% of alcohol concentration, and subjected to the same operation using Sep-Pak C18. These adsorbed fractions were concentrated to dryness, dissolved in 0.02 N HCl and filtered through a 0.22 μm filter (MILLIPORE Co.) to provide samples for amino acid analysis.

The amino acid was measured by the ninhydrin reaction method using each prepared sample for amino acid analysis. As a ninhydrin reagent, ninhydrin coloring solution set for L-8900 (produced by Wako Pure Chemical Industries, Ltd.) was used. The measurement samples were prepared by adding 50 μl of each sample, 50 μl of coloring solution A, 50 μl of coloring solution B to a 96-well multi-plate, followed by stirring, and subsequently heating it in an oven at 80° C. for 5 minutes. This was measured at 550 nm using a multi-plate reader (product name "MTP-450", from CORONA ELECTRIC Co., Ltd.). A calibration curve was made using one made by mixing amino acid mixture standard solution AN-II type and B type (containing 2 nmol of each amino acid of 40 kinds of amino acids).

Figure 11:
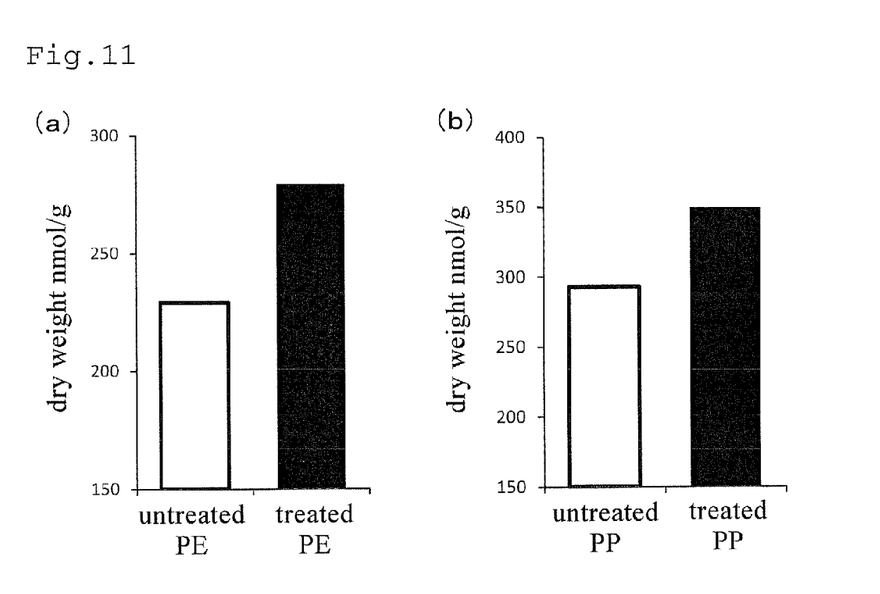
FIG. 11 is a graph showing the results of measuring the total amount of amino acids of samples stored by putting mulberry leaves into bags made of the plant leaf storage sheet according to an embodiment of the present invention (treated PE, treated PP) and samples stored in commercially available bags (untreated PE, untreated PP).

The total amount of amino acids per 1 g of the mulberry leaves dry weight for each sample was calculated based on a value measured by the ninhydrin reaction and the water content measured by a moisture meter. The measurement results are shown in FIG. 11. The total amount of amino acids was shown as the mean value of three samples. As shown in FIG. 11, it was confirmed that the total amount of amino acids of the treated PP was larger than that of the untreated PP, and the total amount of amino acids of the treated PE was larger than that of the untreated PE.

What is claimed is:

1. A resin pellet for manufacturing a harvested tea leaf storage sheet, comprising a polyphenol increasing agent for harvested tea leaves, the polyphenol increasing agent comprising proanthocyanidins and trehalose.

2. The resin pellet according to claim 1, wherein the polyphenol increasing agent comprises the proanthocyanidins and the trehalose at a weight ratio of 1:15 to 1:60.

3. A harvested tea leaf storage sheet, wherein the harvested tea leaf storage sheet is produced by processing the resin pellet according to claim 1 into a sheet.

4. A method for manufacturing a harvested tea leaf storage sheet, comprising:
   melting the resin pellet according to claim 1 at a temperature of 150 to 200° C.; and subsequently
   processing the resin pellet into a sheet having a thickness of 20 to 50 μm.

5. A resin pellet for manufacturing a harvested tea leaf storage sheet, comprising a polyphenol and amino acid increasing agent for harvested tea leaves, the polyphenol and amino acid increasing agent comprising proanthocyanidins and trehalose.

6. The resin pellet according to claim 5, wherein the polyphenol and amino acid increasing agent comprises proanthocyanidins and the trehalose at a weight ratio of 1:15 to 1:60.

7. A harvested tea leaf storage sheet, wherein the harvested tea leaf storage sheet is produced by processing the resin pellet according to claim 5 into a sheet.

8. A method for manufacturing a harvested tea leaf storage sheet, comprising:
   melting the resin pellet according to claim 5 at a temperature of 150 to 200° C.; and subsequently
   processing the resin pellet into a sheet having a thickness of 20 to 50 μm.

* * * * *